United States Patent
Wildenrotter et al.

(10) Patent No.: US 6,673,402 B2
(45) Date of Patent: *Jan. 6, 2004

(54) FIBER-REINFORCED CERAMICS IN SPACECRAFTS AND AERODYNES

(75) Inventors: Karl Wildenrotter, Karlsfeld (DE); Kilian Peetz, Dachau (DE); Hermann Koeberle, Karlsfeld (DE); August Muehlratzer, Munich (DE)

(73) Assignee: MAN Technologies AG, Augsburg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 139 days.

(21) Appl. No.: 09/265,134

(22) Filed: Mar. 8, 1999

(65) Prior Publication Data

US 2002/0064615 A1 May 30, 2002

(51) Int. Cl.[7] .......................... C04B 41/80; C04B 41/83
(52) U.S. Cl. ...................... 428/34.5; 244/121; 244/133
(58) Field of Search ............... 428/34.5, 29.4, 428/408; 244/121, 133; 501/95, 92

(56) References Cited

U.S. PATENT DOCUMENTS

| 4,671,997 | A | * | 6/1987 | Galasso et al. ............. 428/408 |
| 4,713,275 | A | * | 12/1987 | Riccitiello et al. ............. 428/76 |
| 4,766,013 | A | * | 8/1988 | Warren ....................... 427/228 |
| 5,024,979 | A | * | 6/1991 | Debaig-Valade et al. ..... 501/95 |
| 5,052,638 | A | * | 10/1991 | Minovitch ................. 244/53 R |
| 5,489,074 | A | * | 2/1996 | Arnold et al. .......... 244/158 A |
| 5,552,220 | A | * | 9/1996 | Goujard et al. ............. 428/367 |
| 5,965,266 | A | * | 10/1999 | Goujard et al. ............. 428/408 |

FOREIGN PATENT DOCUMENTS

| DE | 43 03 016 | 4/1994 |
| EP | 0 799 809 A | 8/1997 |

OTHER PUBLICATIONS

Article: All–Ceramic Body Flaps for Re–Entry Spacecraft, A. Mühlratzer et al.; MAN Technologie AG; "SAMPE Journal", vol. 38, No. 4, Jul./Aug. 2002.

Wurtinger H., Muhlratzer A: Cost effective Manufacturing Methods for structural Ceramic Matrix Composite (CMC) Components Proceedings of the 1996 International Gas Turbine and Aeroengine Congress & Exhibition, Jun. 10–13, 1996, XP000865972 Birmingham, UK.

* cited by examiner

Primary Examiner—Sandra M. Nolan
(74) Attorney, Agent, or Firm—Reed Smith LLP

(57) ABSTRACT

A movable structural component for a thermomechanically stressed assembly at least partially from fiber reinforced ceramic is disclosed, wherein the movable structural component comprises at least one structural element made by an polymer infiltration and pyrolysis process and at least one structural element made by a chemical vapor process.

21 Claims, 7 Drawing Sheets

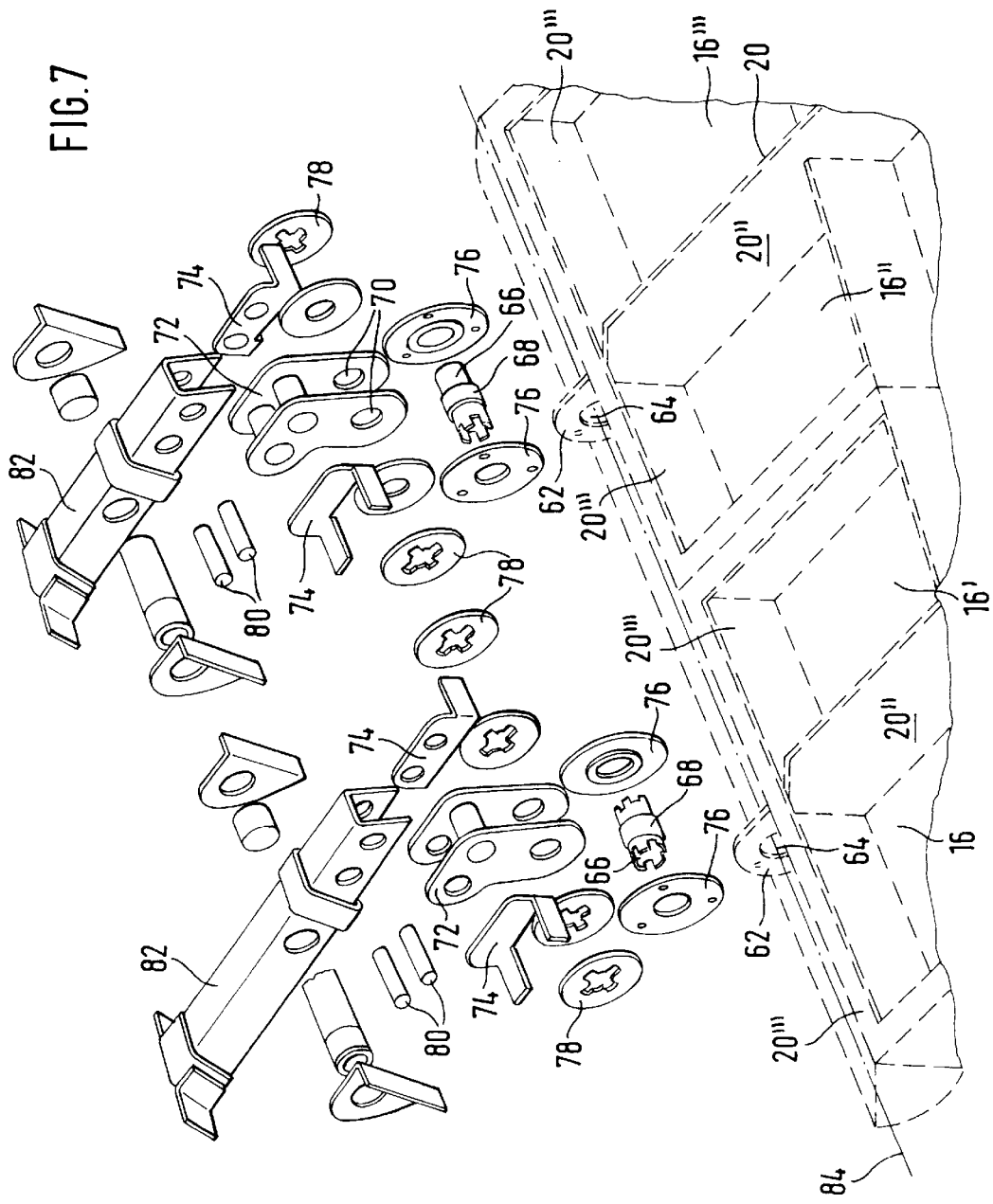

FIBER-REINFORCED CERAMICS IN SPACECRAFTS AND AERODYNES

TECHNICAL FIELD

The present invention refers to a movable structural component for a thermomechanically stressed assembly made from a fiber reinforced ceramic, particularly for reflyable aerodynes in the aviation and aerospace technique as well as a process for producing the structural component.

TECHNICAL BACKGROUND

Reflyable spacecrafts, like for example the Shuttle Orbiter, require for reentering into the atmosphere a protective shield which is, among other things, heat resistant. The Shuttle Orbiter of the United States of America has for this reason body and control surfaces consisting of metallic material which are covered with tiles from a reinforced fiber isolation. These tiles avoid the consequence that under the influence of the highly heated air, converted to a plasma status by the high air speed, the metallic structural elements become so highly heated as to lose their strength and shape stability and will even be destroyed under the load of the flight. Similar or identical problems result with any thermally highly stressed structural elements to be used in the tool making and engineering industry.

Assemblies, structural elements or structural parts, which are based on subsequently disposed or glued-on isolations exhibit considerable disadvantages as is known in the art.

For example the most highly loaded components of a reflyable spacecraft, which, in particular, are the control flaps and such control surfaces, must be made of extremely temperature resistant metallic alloys, so-called superalloys. These have a high specific gravity. Additionally, there is the weight of the thermal isolation. Very dense isolating materials have to be used, to have sufficient resistance against the influences onto such fairings.

Despite the use of very dense fiber isolations known from the state of the art, a heat shield such as that of the Shuttle Orbiter, requires high repair and replacement work since the deposition by gluing and the low strength of the isolating material often results in damage or even complete destruction under the described application conditions. Additionally, there is the weight of the thermal isolation which affects the total weight of the aerodyne.

OBJECT AND SUMMARY OF THE INVENTION

It is a primary object of the present invention to overcome the mentioned technical and economical problems by providing structural components which allow material and structural elements to inherently have an overall increase of thermal and mechanical loading capacity. In connection with the construction of aerodynes, a considerable reduction in weight of the structural components and the reusability or reflyability thereof is envisaged.

The central aspect of the invention is to construct structural components, particularly for reflyable aerospacecrafts, from a fiber composite ceramic. Thereby, depending on the mechanical and thermal requirements to be addressed to individual elements of the structural components, differently produced materials, so called CMC-materials (Ceramic Matrix Composites), could be used.

The present invention thus provides a movable structural component for a thermomechanically stressed structure, which at least partially is built from a fiber reinforced ceramic. Thereby, the movable structural component comprises at least one structural element formed by a polymer infiltration and pyrolysis process (subsequently referred to as LPI-process) and at least one structural element formed by a gaseous phase infiltration or chemical vapor infiltration process (subsequently referred to as CVI-process).

With the structural components according to the invention, a 40% weight saving as well as a significant reduction of the maintenance costs compared with the state of the art is possible. The reduction of the maintenance costs results in that the structural components according to the invention are mechanically and thermally extremely loadable and thus for example during the entry of the atmosphere are less damaged or destroyed.

In accordance with the invention, fiber reinforced ceramics are considered for use which are based on high temperature resistant fibers. These are, particularly, carbon fibers imbedded within a matrix of silicon carbide (C/SiC ceramic), silicon carbide fibers imbedded within a matrix of silicon carbide (SiC/SiC ceramic) or silicon nitride (SiC/$Si_3N_4$-ceramic), aluminum oxide fibers imbedded within an matrix of aluminum oxide ($Al_2O_3/Al_2O_3$-ceramic), mullite fibers imbedded within a mullite ceramic or polyborosilazane fibers (SiBNC) imbedded within a polycarbosilane, polysilazane or silicon carbide matrix. The properties of these ceramic materials reinforced with filaments are mainly known and, for example, described in A. Mühiratzer and H. Köberle in Metall (1991), page 435 cf. These materials, however, may be essentially influenced by the manner of their production and processing, respectively. A discussion of suitable fiber or ceramic materials, respectively, may be also found in "Advanced Materials 2 (1990), no. 9, pages 398–404 and "Journal of European Ceramic Society 12 (1990), pages 27–41".

In accordance with the present invention, carbon reinforced silicon carbide ceramics (C/SiC ceramics), in particular, are envisaged, which, adapted to the final form of the structural element, are formed either via chemical vapor infiltration (CVI-process) or via (liquid) polymer infiltration and pyrolysis (LPI-process). The material producible according to the CVI-process is particularly suitable for mechanically highly stressed parts. In case of, for example, a control flap of an aerodyne, these are the longitudinal and transversal load bearing implements, the connecting or push-rod, the bearings and the hinges as will be further described in detail. For mechanically or thermally less stressed structural elements, a material produced according to the LPI-process is also suitable.

In accordance with an aspect of the invention, the structural component is characterized in that the at least one structural element formed by the liquid polymer infiltration and pyrolysis process is embodied as the base of the movable structural component. These mostly large sized or volumed bases are, in particular, mechanically less stressed so that they may be produced by the LPI-process.

According to another aspect of the invention, the base is a box-type segment with a bottom wall and side walls integrally formed thereon. This measure allows for a wide variation in the final size of the structural component and an accommodation to the individual purpose of use. Via the integrally formed side walls, individual box-type segments may be coupled to larger structural elements or components, respectively.

In a suitable embodiment of the invention, the bottom wall, of the at least one box-type segment, is an essentially plane surface opposite to the side walls. This embodiment avoids the formation of so-called hot spots and along with it the premature wear of the structural element by thermal and/also or mechanical load.

Further, it is within the scope of the invention that the junction region between the bottom wall and the side walls is chamfered. Also, this embodiment avoids or minimizes the formation of hot spots.

According to another aspect of the invention, the at least one box-type segment of the base is stiffened by reinforcement ribs which are, in particular, integrally disposed on the bottom wall and the side walls. These reinforcement ribs or the like avoid torsions of the structural element or the structural component, respectively, under mechanical stress and allow, in particular, a lightweight construction required for the structural elements or structural components, respectively, like, for example, the control flaps of a reflyable aerodyne. These reinforcement ribs may be arranged transversally, longitudinally or diagonally.

Furthermore, it is within the scope of the invention that the at least one box-type segment of the base has a cover or the like, which is reversibly mountable on the side walls, thereby promoting the stiffening of the segment and which, by its essentially plane surface, allocates a mechanical stress over all the structural element.

In a further and most particularly preferred embodiment of the present invention, the base is composed of several box-type segments which, as already mentioned, are connectable with each other by respective adjacent side walls. This allows the exchange of possibly damaged or destroyed individual segments and, in the construction, a great variability with respect to the size of the structural elements or structural components to be assembled.

Of high importance for a structural element or such a structural component, embodied according to the invention which, for example, is used as control flap for a reflyable aerodyne, several box-type segments are arranged side by side such that the joints between the adjacent side walls extend in a direction which is essentially parallel to a possible movement of the thermomechanically stressed assembly. This special arrangement of the box-type segments in connection with aerodynes is not only aerodynamically favorable but also avoids the formation of the so-called hot spots which may result in the destruction of the structural element or of an individual segment thereof.

As mentioned above, it is within the scope of the invention that the at least one structural element formed by a chemical vapor infiltration process is embodied as a load transmission and/or bearing element of the movable structural component. The ceramics which are produced close to their final shape by the chemical vapor infiltration process due to the increased density have a very pure matrix with fine crystalline, dense microstructure imparting a high thermomechanical resistance, stiffness, compressive strength and wear resistance to the material. Also the high fracture toughness of the so produced materials has to be emphasized.

Further in accordance with the invention, the load transmission and/or also the bearing element(s) are mounted on the base of the movable structural component for its movement.

The load transmission and bearing element comprise at least one longitudinal beam and at least one, preferably two, transversal beams which are releasably mountable to each other and on the side wall of the at least one box-type segment of the base. If there is only one box-type segment, the longitudinal and/or at least the transversal beam(s), each extend centrally between the respective side walls.

In general the at least one longitudinal beam and the at least one, preferably two, transversal beams, are about centrally received by and arranged on the base. A highest possible stability of the structural component results from this arrangement with respect to its movement relative to an assembly with which it is connected.

The load transmission and bearing element comprises at least one rod or the like which transfers a force produced by a motor over the at least longitudinal beam and the at least one, preferably two, transversal beams of the base of the movable structural component.

Preferably, the load transmission and bearing element further comprise a bearing between the at least one beam and the at least one, preferably two, transversal beams as well as the at least one rod, which is semi-spherical, spherical, dome or the like shaped. During the entrance into the atmosphere a reflyable aerodyne, particularly its control flaps, is exposed not only to thermal but also to great mechanical stresses which may cause lateral torsions and often even local press compactions at the structural component or the assembly, respectively. Such lateral torsions can be received or balanced by the bearings used according to the invention which are formed semi-spherical, spherical, dome or the like shaped.

The bearing therefore has preferably a semi-spherical, spherical, dome or the like shaped formed bearing shell which is supported by a bearing pin or bolt or the like on the at least one transversal beam and a means for receiving the bearing shell cooperating therewith which is disposed at the end side of the rod and vice versa.

For stabilization or more stable movable connection of the structural component with the assembly there is arranged preferably at least one, preferably two further bearing elements for movably connecting the movable structural component with the assembly on at least one of the side walls of the at least one box-type segment, which is/are formed particularly like a hinge.

In a particularly suitable embodiment of the structural component of the present invention, at least one, preferably two of the side walls are elongated and provided with bores at its end side for receiving corresponding bearing pins or the like of the assembly, the boring axes of which are aligned to each other or to the rotation axis of the one bearing. The boring axes thus are arranged parallel to each other or to the rotation axis of the one bearing.

In a further preferred embodiment of the structural component of the present invention, the side walls and/or longitudinal beams and/or transversal beams and/or rods are hollow sectioned. This measure promotes the desired light construction of the overall assembly having simultaneously a high stiffness.

An essential feature of the present structural component is that, for increasing its mechanical and thermal stability, coupling elements like screws, pins, rivets and the like, formed by chemical vapor infiltration are provided for a detachable connection of the structural elements with each other which particularly are used in the region of the side walls and the base. Such connecting elements naturally are exposed to high mechanical stresses and represent starting points for the formation of hot spots. The choice of material and arrangement of the connection elements contributes to the further stabilization of the structural components.

A further feature of the present invention is that the structural element for the protection and stabilization of its outer surface, particularly for protection against oxidation, is provided with a suitable protective layer, if necessary. For structural elements produced according to the CVI-process then at least one layer of about 100 µm thickness is used which is formed essentially of the same material as the matrix forming material. This layer is applied by chemical vapor deposition. In the case of a C/Si ceramic, a SiC/SiC ceramic or related ceramic such a protective layer is particularly effective if at least one boron containing silicon carbide layer is provided. Parts without joining surfaces also may be equipped with a pure silicon carbide layer onto which a multiphase cover layer consisting of a glass matrix with imbedded refractory phases is applied according to German patents P 40 34 001 and P 44 43 789.

As mentioned for several times, the aforedescribed structural component for a thermomechanically stressed assembly may be embodied as a movable control flap or the like of an aerodyne. Particularly, reflyable spacecrafts which are exposed to high thermal and mechanical stresses during reentrance into the atmosphere as well as control surfaces of diverse military missiles which receive similar stresses may exploit the structural component according to the invention. It may be also envisaged to use the structural components according to the invention for producing thermally and mechanically highly stressed tools and machine parts.

The invention also refers to a process for producing the aforedescribed structural components from a fiber reinforced ceramic for a thermomechanically stressed assembly. At least one structural element is produced by the LPI-process, at least one structural element is formed by the CVI-process and the structural elements are combined to the claimed structural component in a suitable way.

The structural elements preferably are joined together by connecting elements, like screws, pins, bolts, rivets and the like produced by the CVI-process.

The afore-mentioned processes have different advantages which can be used in a suitable manner for the individual structural components, particularly the control flaps for reflyable spacecrafts.

In principle, for lightweight constructions the integral construction is to be preferred. The known manufacturing processes for fiber composite ceramics, however, allow this way of construction only in a limited range for large sized or volumed components. According to the invention, therefore, a so-called hybrid or composite construction was developed in which mechanically highly stressed structural elements of a structural component, for example these are with the afore mentioned control flap the longitudinal and transversal beams (load bearing implements), the rod, the bearings and the hinges, are produced by the so-called CVI-process, particularly the gradient CVI-process. This process provides a high performance material with respect to its thermomechanical properties. The essential feature of these materials is their matrix with fine crystalline, dense structure which imparts the high thermomechanical resistance, stiffness, pressure resistance and wear resistance to the material. Essential is also the high fracture toughness of this material in connection with the construction of security structural members.

Structural elements which are less mechanically stressed, like the control flap body of a reflyable spacecraft according to the invention are produced according to the so-called LPI process. Generally either fabric cuts are disposed on molds by means of the wet laminating process or disposed dry in a forging die and filled with the matrix forming resin according to the RTM (Resin Transfer Molding) process.

According to the invention structural elements formed by the LPI-process are produced as follows: Fabric cuts from thermally highly stressable fibers are disposed on positive molds having a shape close to the end shape or into such forging dies; the disposed fabric cuts preferably are impregnated with an organic polymer or polymer resin corresponding to the fiber; then the material is cured under increased temperature and pressure and the so formed green compact is submitted to a pyrolysis treatment at about 900° to 1,600° C. for producing a fiber reinforced matrix or the desired ceramic material, respectively.

In a preferred way the curing takes place at 200° C. and at about 5 bar and the pyrolysis treatment at about 1,200° C.

To protect the aforeproduced structural elements against oxidation, if necessary, —this is particularly required in case carbon fibers or fibers covered with pyrocarbon are used for producing the ceramic—, according to the invention, they are provided at least partly with at least one protective layer produced by chemical vapor deposition (CVD process). The material forming the protective layer preferably will correspond to the material forming the matrix.

For producing the at least one structural element produced by chemical vapor infiltration (CVI process), a fabric layer of thermally highly stressable fibers is at least partly and spaced apart, provided with a suitable adhesive, the fabric layer then wound up to an essentially tube shaped fiber preform with suitable diameter, the fiber preform inserted into a chemical vapor infiltration reactor and submitted to a gradient chemical vapor infiltration under the action of a methyltrichlorsilane/hydrogen process gas or an equivalent process gas. Details of this process can be derived from the following example.

Essentially a temperature gradient of between 700° C. inside the tube shaped fiber preform and of about 1,150° C. in the reactor is adjusted.

The process according to the invention is characterized in that thermally highly stressable fibers are incorporated in a respective matrix bed which are chosen from the group of carbon, silicon carbide, aluminum oxide, mullit and/or polyborosilazane fibers.

For forming the matrix, starting materials will be chosen, which essentially correspond to the fiber material. Preferably a C/SiC ceramic is used.

In the following, the invention will be explained in more detail by means of a preferred embodiment and with reference to the following drawings as well as to an example in which the manufacturing process for the structural component of the present invention is given.

BRIEF DESCRIPTION OF THE DRAWINGS

In the drawings:

FIG. 7 is schematic, partially broken and exploded view of the further embodiments of the structural elements formed by the chemical vapor infiltration process of FIG. 6.

DESCRIPTION OF THE PREFERRED EMBODIMENTS

Figure 1:
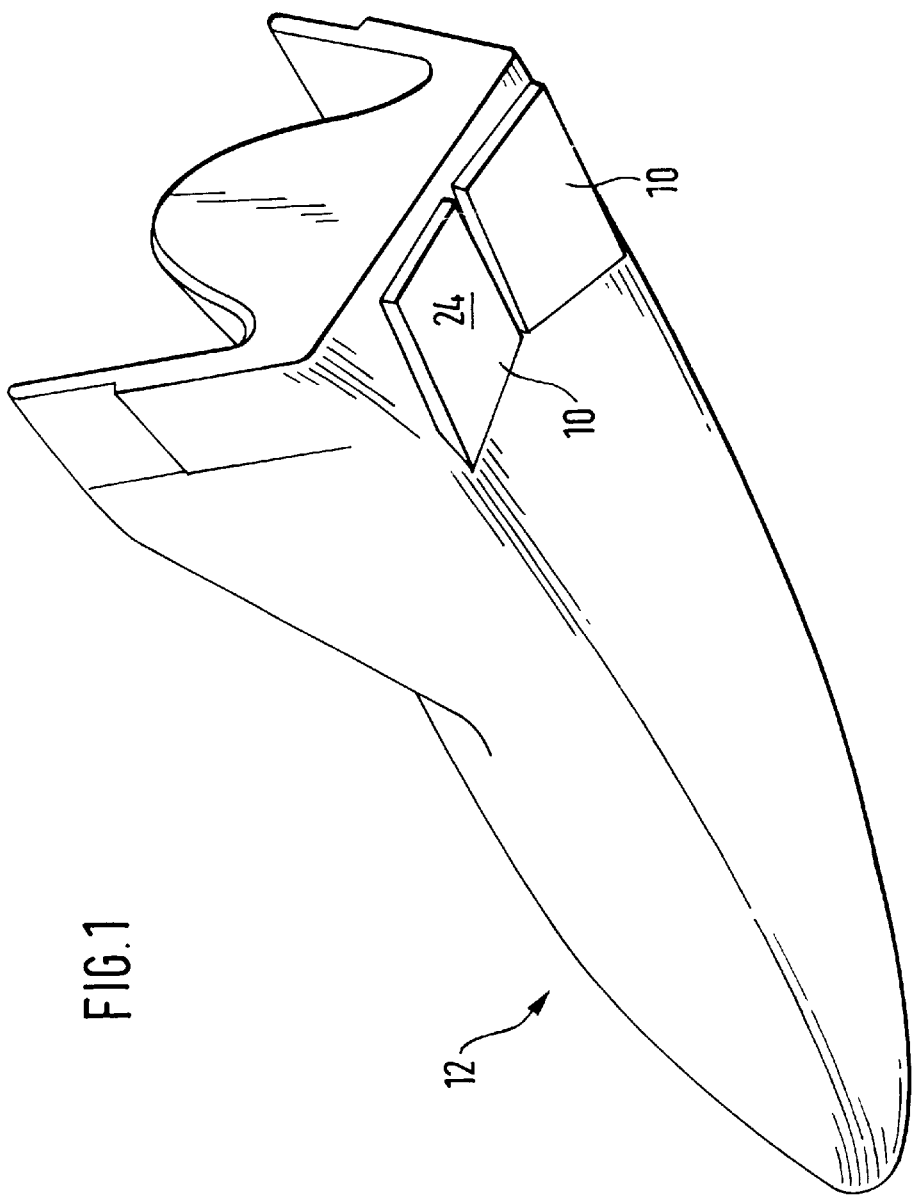
FIG. 1 is a schematic perspective view of an embodiment of two movable structural components according to the invention on a thermomechanically stressed assembly.

In FIG. 1 there is presented schematically an embodiment of two movable structural components 10 of the invention for a mechanically stressed assembly 12. Here, the two movable structural components 10, for example, are embodied as control flaps, so-called body flaps, or the like control surfaces of a thermomechanically highly stressed assembly 12. The control flaps or the like control surfaces are provided as an elevator and rudder. For controlling the pitch and wing dropping and for trimming the angle of incidence of the assembly 12 the control flaps or the like control surfaces are embodied movably, i.e. for example pivotably with respect to the assembly.

As thermomechanically stressed assembly 12, aerodynes are considered which both thermally and mechanically become highly stressed. Particularly, such aerodynes are reflyable spacecrafts like the Shuttle Orbiter or the Experimental Orbital Glider X-38, exemplified in FIG. 1, which are exposed to such extreme thermal and/or mechanical conditions during reentrance into the atmosphere. Operation temperatures of about 1,000 to 2,000° C. regularly occur. Furthermore, similar loads act on, for example, military missiles.

The movable structural component 10 for a thermomechanically stressed assembly 12 which consists at least partially of fiber reinforced ceramic, comprises at least one structural element made by polymer infiltration and pyrolysis process and at least one structural element made by chemical vapor infiltration. As far as possible, the movable structural component 10 has additionally one or more structural elements which consist of metal or the aforementioned metal alloy.

Figure 2:
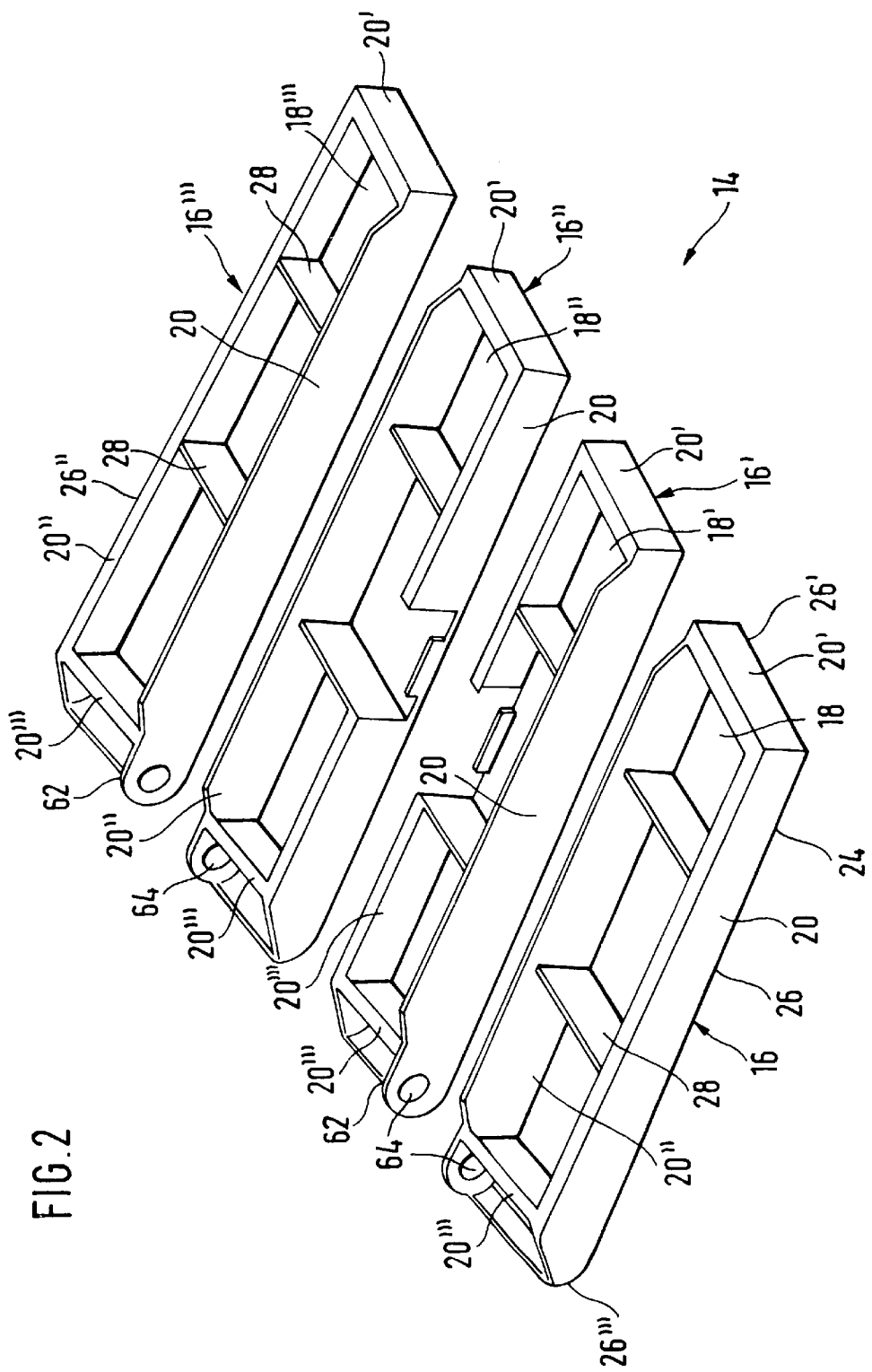
FIG. 2 is a schematic perspective partially exploded view of an embodiment of a structural element of FIG. 1 according to the invention formed by polymer infiltration and pyrolysis process in an enlarged representation.

According to FIG. 2 the at least one structural element made by polymer infiltration and pyrolysis process is embodied as the base 14 of the movable structural component 10. The base 14 consists of at least one box-type segment 16 having a bottom wall 18 and side walls 20, 20', 20", 20'" integrally formed thereon. As can be particularly derived from FIG. 2, the base 14 in this embodiment is composed of several, essentially elongated box-type segments 16, 16', 16'". The box-type segments 16, 16', 16", 16'" are connectable by adjacent side walls 20, 20". With such an embodiment the torsion stiffness of the base 14 may be essentially increased. On the other hand it is easily possible to disassemble individual box-type segments 16, 16', 16", 16'" for maintenance and repair purposes, if necessary and afterwards to reassemble or to completely exchange them.

In a particularly advantageous way the several elongated box type segments 16, 16', 16", 16'" are arranged side by side such that the joints 22, 22', 22" (see particularly FIG. 4) between the respectively adjacent side walls 20, 20" extend in a direction, which is essentially parallel to a possible movement of the thermomechanically stressed assembly 12. In so far the joints 22, 22', 22" are arranged essentially parallel to the direction of movement or flight, respectively, of the aerodyne. With such a very favorable fluidic arrangement of the joints 22, 22', 22", flow resistances at the movable component 10 altogether may be constructionally easily and safely avoided and therewith local overheatings, so-called hot spots, which may form in narrow, purely heat radiating fissures.

For further improvement of the fluidic the bottom walls 18, 18', 18", 18'" of the box-type segments 16, 16', 16", 16'" of the base 14 have a surface 24 which is opposite the side walls 20, 20', 20" 20'" and in accordance with FIG. 1 is essentially plane.

The junction area 26, 26', 26" 26'" between the respective bottom wall 18, 18', 18" 18'" and the allocated at least peripheral side walls 20, 20', 20", 20'" from fluidic reasons is also chamfered. Also in this way additional local overheatings, so-called hot spots, are excluded.

Such a chamfering of the junction area 26, 26', 26", 26'", in this connection, can be achieved by an integral construction or shaping of the respective box-type segment 16, 16', 16" 16'". Also it may be considered to provide the respective junction area 26, 26', 26" 26'" of the respective box-type segment 16, 16', 16", 16'" with separate correspondingly shaped structural elements (not shown). Such structural elements which are embodied about an angular inside are adapted to the outer contour of the respective box-type segment 16, 16' 16" 16'" and outside are provided with a chamfering of desired size and/or shape.

The box-type segments 16, 16', 16" 16'" of the base 14 are stiffened by reinforcement ribs 28, or the like . The reinforcement ribs 28 thereby each are, particularly integrally, formed with the bottom wall 18, 18', 18" 18'" and the side wall 20, 20', 20" 20'". In the embodiment of the box-type segments 16, 16', 16" 16'" shown in FIG. 2 the reinforcement ribs 28 each are arranged between opposing side walls 20 and 20", i.e. extend essentially vertically or transversally to the joints 22, 22', 22" However, it is also possible to arrange reinforcement ribs 28 alternatively or even cumulative also in longitudinal and/or diagonal direction for a further stiffening of the respective box-type segment 16, 16', 16" 16'" and thus the whole base 14.

Figure 3:
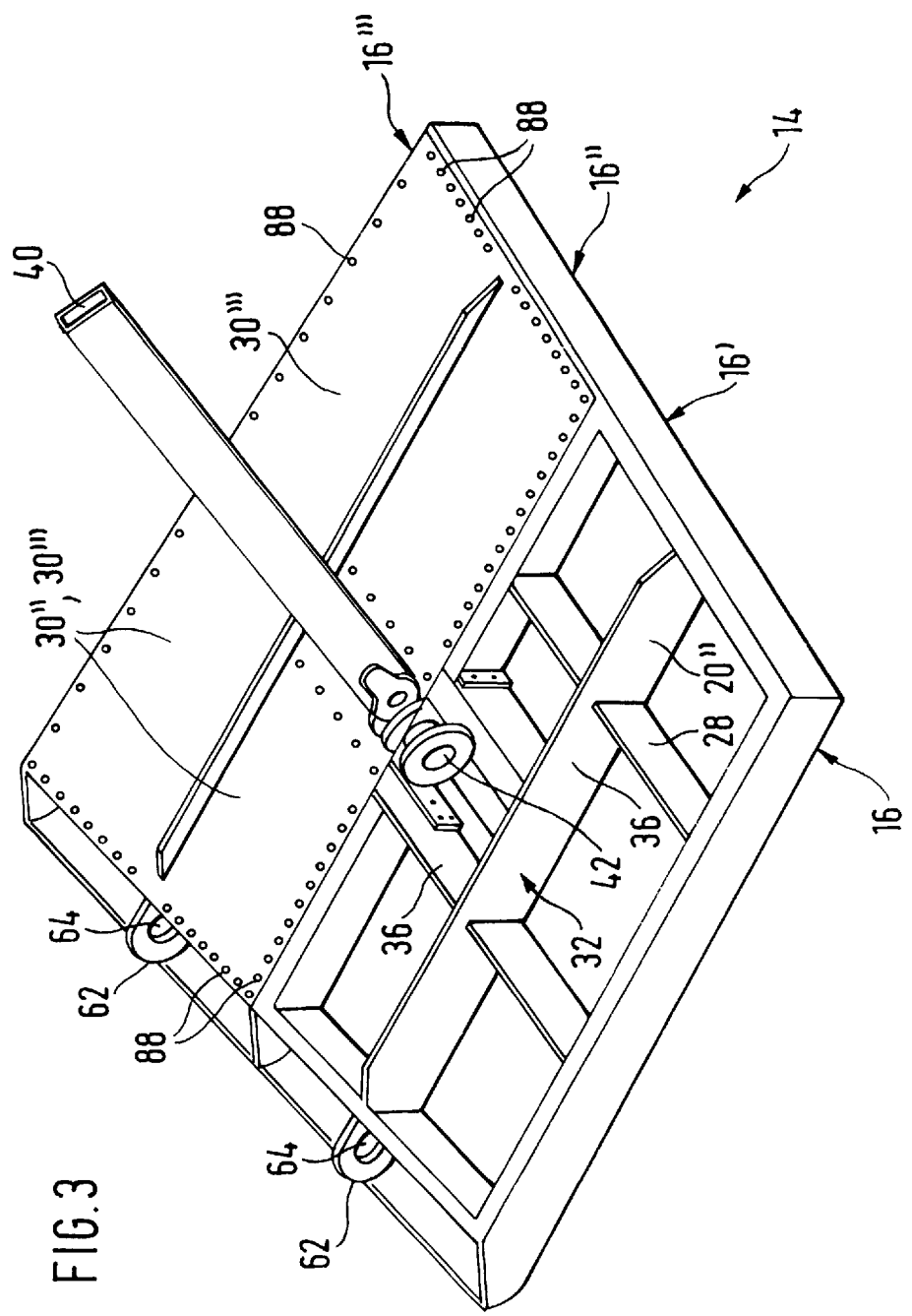
FIG. 3 is a perspective view of the embodiment of the structural element according to FIG. 2 formed by polymer infiltration and pyrolysis process in assembled form, together with partially provided covers of the invention and embodiments of structural elements according to the invention formed by chemical vapor infiltration.

To further stiffen the base 14 individual, preferably any of the box-type segments 16, 16', 16" 16'" may be provided with covers 30, 30', 30" 30'" which each are detachably fastened at the side walls 20, 20', 20" 20'" of each box type segment 16, 16', 16" 16'". In FIG. 3 only the covers 30" 30'" of the box-type segments 16" or 16'", respectively, are shown.

Figure 4:
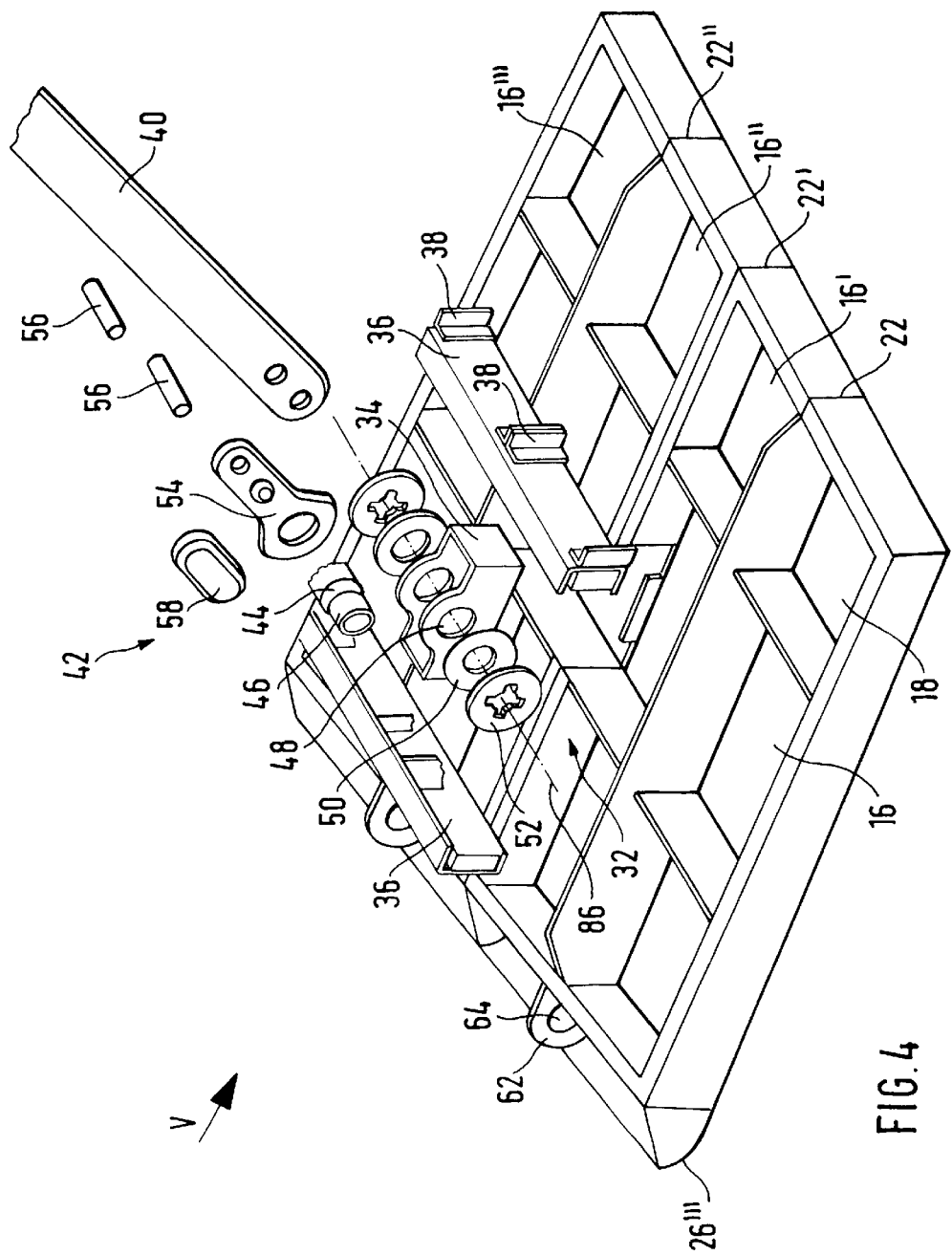
FIG. 4 is a schematic, partially exploded view of the embodiment of the inventively formed structural element of FIG. 3 without a cover.

According to FIGS. 3 and 4, the at least one structural element made by chemical vapor infiltration is fashioned as a mechanically highly stressed load transmission and bearing element 32 of the movable structural component 10. The load transmission and bearing element 32 is arranged on the base 14 of the movable structural component 10 for its movement, i.e. in the present embodiment for its pivoting.

As can be particularly derived from FIG. 4 the loading transmission and bearing element 32 comprises at least one longitudinal beam and at least one, preferably two, transversal beams. The longitudinal beam 32 and transversal beams 34 are detachably joint to each other and to the side walls 20, 20" of the at least one box-type segment 16, 16', 16", 16'" of the base 14 by for example angles or the like. In the shown embodiment the longitudinal beam 34 and the two transversal beams 36 are received by and disposed on the base 14 about centrally. In so far the two transversal beams 36 extend essentially over the two adjacent box-type segments 16' and 16".

The load transmission and bearing element 32 further comprises a pushing rod 40. The rod 40 transfers a load or power produced by a not shown (servo) motor in a way known as such. This load or power is introduced from the rod 40 over the longitudinal beam 34 and the transversal beams 36 into the side walls 20, 20" of the two box-type segments 16' and 16" and such to the base 14 of the movable structural component 10 altogether.

According to FIG. 3 and particularly 4 the load transmission and bearing element 32 comprises additionally a bearing 42. The bearing 42 on the one hand is arranged between the longitudinal beam 34 and the two transversal beams 36 as well as the rod 40 on the other hand is fashioned particularly semispherical, spherical or dome-shaped and the like. By such a semi-spherical, spherical, dome-shaped or the like embodiment of the bearing 42 undesired transversal and torsion forces can be cushioned and thus local press compaction can be avoided.

According to FIG. 4 the bearing 42 comprises a semispherical, spherical, dome-shaped or the like embodied bearing shell 44 or the like bearing ring. The bearing shell 44 is supported by a bearing pin or bolt or the like bearing tube, that is received in borings at the end sides of the longitudinal beam 34. For axially securing the bearing pin 46 with the bearing shell 44 in the longitudinal beam 34 plain washers 50 and lock washers 52 or the like securing means, like for example transversal pins, are provided on each end.

Furthermore, the bearing 42 shown in FIG. 4 comprises a bearing shell receiving means 53 or the bearing plate cooperating with the bearing shell 44 which is arranged at the end side of the rod 40 by means of connecting pins or bolts 56 and/or other securing elements 58.

Figure 5:
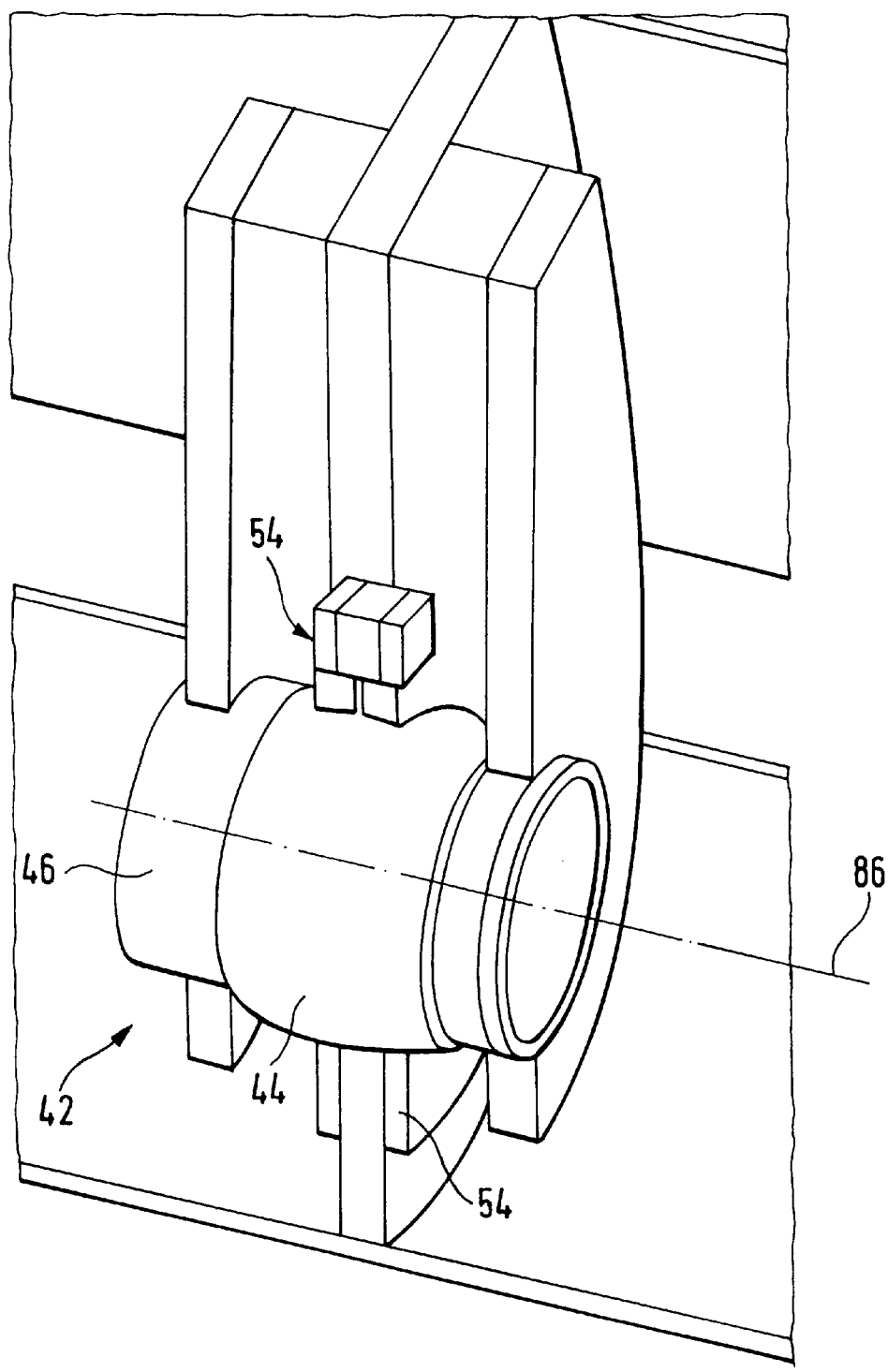
FIG. 5 illustrates an enlarged, perspective partial view of the embodiment of one of the structural elements formed by chemical vapor infiltration in assembled form corresponding to arrow V in FIG. 4.

In FIG. 5 the particular constructive assembly of the bearing 42 is shown enlarged. By means of the semispherical, spherical, dome-shaped or the like shaped embodiment of the bearing shell 44 which is cooperating with a bearing shell receiving means 54 adapted thereto, occurring torsions, transversal and pitch forces between the movable structural component 10 and the (servo)motor at the assembly 12 due to side torsions of the base 14 and the like can be reliably excluded. Along therewith local press compactions and thus temporal blockings or lasting damages, respectively of the movable structural component 10 are avoided, which possibly may again result in an immovableness of the structural component 10.

Figure 6:
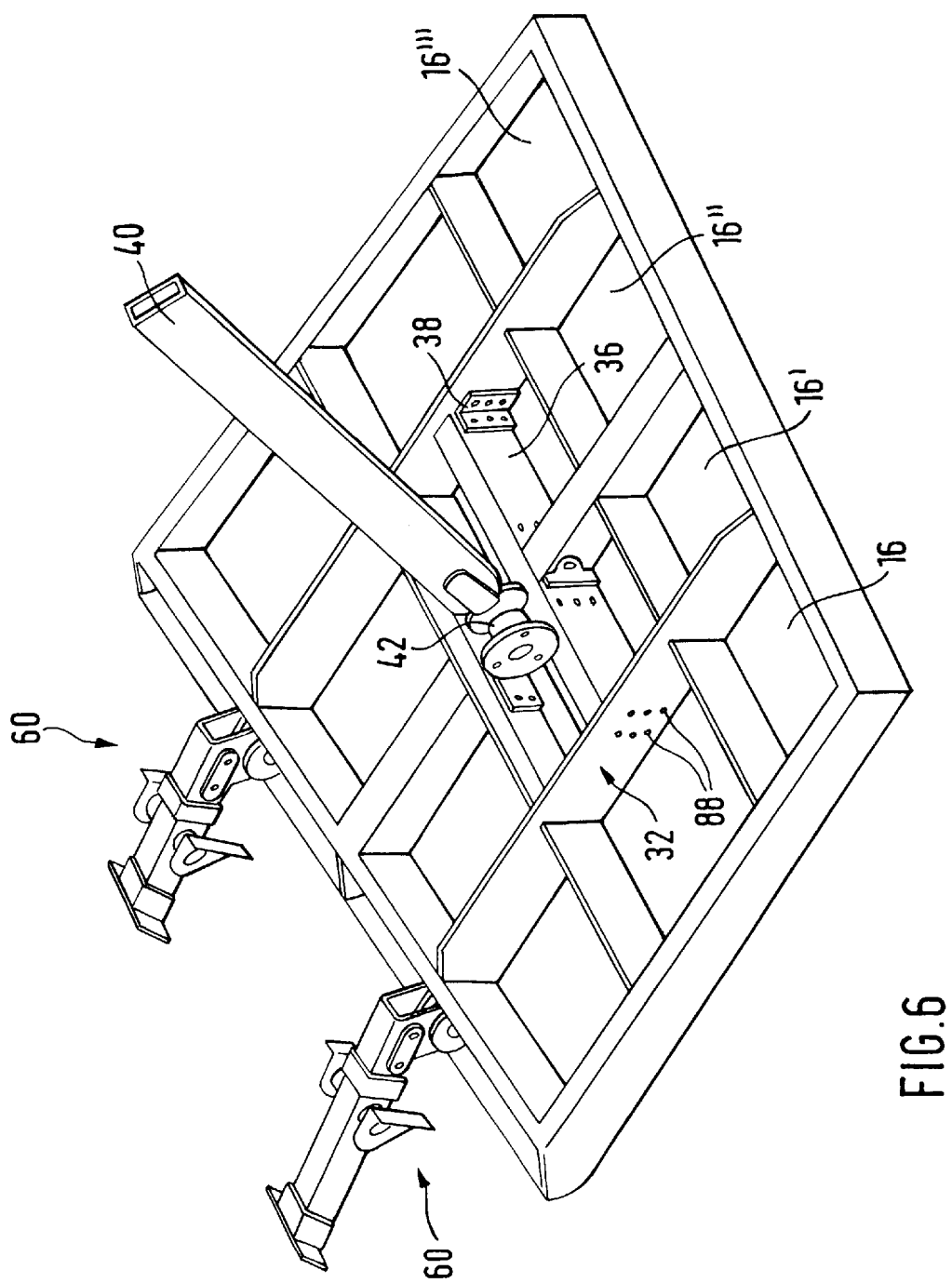
FIG. 6 is a perspective view of the embodiment of the structural element according to FIG. 2 formed by polymer infiltration and pyrolysis process in assembled form without the inventive cover but together with further embodiments of structural elements formed by chemical vapor infiltration.

The embodiment shown in FIGS. 6 and 7 of the movable structural component according to the invention comprises moreover at least one, preferably two, bearing elements 60. The bearing elements 60 also are structural elements formed by chemical vapor infiltration. The bearing elements 60 are provided to ensure a certain static suspension and at the same time a movable connection of the movable structural component 10 with the assembly 12. The two bearing elements 60 are allocated to at least one of the side walls 20''' of the box-type segments 16, 16', 16", 16''' and are particularly formed like a hinge. The two bearing elements 60 are identical in structure. Components corresponding to each other thus are provided each with identical reference numbers.

The side walls 20 of the box-type segments 16 and 16" and/or the side walls 20" of the box-type segments 16' and 16''' each are elongated and provided with bores 64 at the end side region 62. The bores 64 serve to receive a corresponding bearing pin 66 or the like bearing tube, which is also embodied preferably with a semi-spherical, spherical, dome-like or the like shaped bearing shell 68 or the like bearing ring corresponding to the bearing 42. In so far the bearing shell 66 is arranged on the bearing pin 66 which is received in borings 70 at the end sides of an angle rest 72. The angle rest 72 is composed of two L-shaped plates with spacers disposed there between. To actually secure the bearing pin 66 with the bearing shell 68 in the angle rest 72 securing elements 74, plain washers 76 and lock washers 78 or other securing elements like for example transversal pins are provided at each of the end sides. The angle rest 72 again is secured by corresponding bearing pins 80 on a connecting support 82, which is arranged on the assembly 12.

The bore axes 84 of the bores 64 are oriented to each other or to the rotation and bore axis 86 of the bearing 42 and thus all arranged parallel.

Furthermore, the side walls 20, 20', 20", 20''' and/or the longitudinal beam 34 and/or the transversal beams 36 and/or the rod 40 are hollow profiled for stiffening.

Preferably all of the structural elements are detachably connectable by connecting elements 88, particularly screws or the like. The connecting elements 88 preferably are placed in the region of the side walls 20, 20', 20", 20''' of the box-type segments 16, 16', 16", 16''' of the base 14 so that sites of disturbances at the thermally highly stressed surface 24 of the bottom wall 18, 18', 18", 18''' are avoided and in so far offset to less stressed areas.

EXAMPLE

The movable structural component of the invention may be used as a control flap for reflyable spacecrafts or aerodynes, respectively. Thereby reusable control flaps can be provided for the projects Crew Return Vehicle (CRV) and Crew Transfer vehicle (CTV) and at first for the afore test vehicle X-38 in connection with the construction and operation of a space station.

In the following, therefore the manufacturing of a control flap for the Experimental Orbit Glider X-38 is described in an exemplifying and not limiting way.

A control flap for X-38 is composed of the following CMC components, which depending on their function and their shape are produced by the gradient CVI-process or the LPI-process. In the example carbon reinforced silicon carbide ceramics are used as the material.

The components are represented in detail in FIGS. 2, 4 and 7.

In the manufacturing of the large box-type segments 16, 16', 16", 16''' for the base 14 tailored carbon fiber fabrics, the fibers of which are provided with a layer or pyrocarbon, are led over positive molds in a wet laminating process using polycarbosilane resin. A tailor and deposition plan for fabric layers is so fashioned that the reinforcing or stiffening ribs 28 inside the box-type segments 16, 16', 16", 16''' are integrally, i.e. with filaments, bound to the outer surface of the box-type segments 16, 16', 16", 16''', thus to the bottom wall 18 and the side walls 20, 20', 20", 20'''. Also the covers 30, 30', 30", 30''' which are adapted to the size of the box-type segments 16, 16', 16", 16''', are produced by the wet laminating process.

The led box-type segments 16, 16', 16", 16''' are cured at 200° C. and 5 bar pressure in an autoclave, whereas the covers 30, 30', 30", 30''' are cured under the same conditions in a hot press.

The so obtained green compacts products having the characteristics of plastic composite parts are subjected to pyrolysis in a high temperature oven under inert gas atmosphere. At a temperature of 1,200° C., the cured polycarbosilane resin is decomposed with elimination of essentially methane, hydrogen and aromatics under formation of a solid of amorphous silicon carbide (SiC) which by the processing of the starting resin under ambient air contains some oxygen. The formed SiC solid encloses the fibers as a matrix material of a ceramic fiber composite material.

The thermal resin decomposition regularly is accompanied by a decrease in mass and volume which results in the formation of fissures and pores in the solid residue. To balance this loss, as required, about five subsequent infiltration cycles with the polycarbosilane resin are carried out with respective subsequent curing and pyrolysis treatments. With this procedure, components are obtained having a fiber content of about 43 vol. % and about 12 vol. % remaining porosity.

Thereafter the fitting surfaces for the joining of the boxes or box-type segments 16, 16', 16", 16''' and the arrangement of the covers 30, 30', 30", 30''' are processed by grinding and the bores for the screwed connection are set, wherein in both cases diamond tools are used. The components then are covered with a SiC layer of 0.1 mm to 0.2 mm thickness by chemical vapor deposition, wherein the thickness of the layer is taken into account by a respective over dimension of the bores and a dimension smaller than specified of the screw pins/bolts 88.

For the connection of the components screw bolts 88 having a shaft diameter of about 6 mm and nuts with a corresponding inner diameter are used which are made according to German patent P 43 37 043 from C/SiC-plates produced by the gradient CVI-process.

The components for the (pushing)rod 40, the longitudinal and transversal beams 34, 36 for the mounting to the rear structure of the aerodyne, the hinges 60 and bearing 42 are produced by the gradient CVI-process.

Therefore, tubular fiber preforms are produced in a fabric winding process with slight over dimensionings with respect to the required final dimension of the prefabricated part, whereby for the binding of the fabric layers and for their fixation in a desired and suitable distance a suitable adhesive is applied to the fabric. By a pyrolysis treatment at 1,000° C., the adhesive decomposes or degrades to carbon which in the subsequent CVI process step causes the shape and dimension stability of the preforms.

For the box-type segments 16, 16', 16", 16''' the rod 40 and the parts for the mounting to the rear structure of the aerodynes rectangular tubes are used as preforms and for the bearing and hinges such with a circular cross section.

The fiber preforms inserted into molding flanges are introduced into the reactor of the gradient CVI-plant such that the process gas stream (here methyltrichlorosilane [$CH_3SiCl_3$/hydrogen [$H_2$]) is fed into the inside of the tube and due to a sealing at the flange has to flow through the fiber wall. This causes a pressure gradient over the fiber wall. The reactor room is heated to a uniform temperature of 1,150° C. so that the outside of the fiber preform is also at this temperature. The inside of the tube contrary is kept at a lower temperature (initially about 700° C.) by means of an inserted water cooling, i.e. a defined temperature gradient is adjusted. This temperature gradient causes that the process gas fed from the inside of the tube penetrates the fiber structure, without that a deposition of silicon carbide (SiC) occurs, because the temperature is not sufficient for this thermally induced process. Only on the outer zone of the tube, being at the higher temperature, the deposition of SiC onto the fibers occurs. By the filling of the pores with SiC, the thermal conduction increases, whereby in the course of the infiltration the temperature causing the SiC deposition moves through the whole thickness of the wall of the fiber body and thus a complete matrix infiltration is achieved. The advantage of this procedure is in the relatively short process time because due to the forced flow through of the fiber structure a process gas pressure in the dimension of atmospheric pressure and a high process temperature may by applied, without an early occlusion of the surface blown by the process gas occurs.

From the so produced tube shaped C/SiC-semifinished products bearing and hinge parts 42, 60 as well as bearing boxes 16, 16', 16", 16''', rods 40 and beams 34, 36 are cut with coarse dimensioning. The tube parts are dimension processed by grinding with subtraction of the thickness of the layer for the CVD-SiC-layer. Subsequently the parts are covered by the CVD process with 0.15 mm SiC and finally polished.

As a last process step, the final mounting of the parts is carried out on a dressing bench wherein a defined prestress of 3 kN is applied to the bolts 88.

The finished control flap for example has an overall length of 1.6 m and an overall width of 1.5 m. It is about 40% more light than a usual control flap of the same size produced by a superalloy and isolation tiles.

The movable structural component according to the invention is not limited to the shown embodiment. It may by envisaged to provide for example two load transmission and bearing elements 32 and only one bearing element 60 instead of a one load transmission and bearing element 32 and the two bearing elements 60 to obtain a static predefined suspension according to the aforementioned embodiment. Simultaneously it could be possible to offset the two transmission and bearing elements 32 from the center of the base 14 to its corners and the bearing element 60 to about the center of the side wall 20''' of the box-type segments 16, 16', 16", 16''' of the base 14.

Furthermore, it is possible to plan a kinematic reversal with respect to the arrangement of the bearing bolt 46 with the bearing shell 44 as well as the bearing shell receiving means 54 of the bearing 42 or the bearing pin 66 with the bearing shell 68 and the bores of the bearing element 60. This then could result in that the bearing 42 is embodied to be comparable with both bearing elements 60 and vice versa.

Finally, it is possible that individual parts of the structural component 10 and/or the assembly 12 consist in an alternative or cumulative embodiment at least partially of metal, a metal alloy or the like as for example the longitudinal beam 34 and the two transversal beams 36.

While the foregoing description and drawings represent the preferred embodiments of the present invention, it will be obvious to those skilled in the art that various changes and modifications may be made therein without departing from the true spirit and scope of the present invention.

What is claimed is:

1. A movable control surface for a thermomechanically stressed aerodyne or spacecraft the movable control surface comprising:
   a moveable base made of fiber reinforced ceramic made by a polymer infiltration and pyrolysis process;
   a moveable control member of fiber reinforced ceramic made by a chemical vapor infiltration process connected to said base.

2. The movable control surface of claim 1, wherein the base part includes at least one box-type segment having a bottom wall and side walls integrally formed thereon.

3. The movable control surface of claim 2, wherein the bottom wall of the at least one box-type segment has an essentially planar surface opposite the side walls.

4. The movable control surface of claim 2, wherein a transition region between the bottom wall and the side walls is chamfered.

5. The movable control surface of claim 2, wherein the at least one box-type segment of the base is stiffened by reinforcement ribs particularly integrally formed on the bottom wall and the side walls.

6. The movable control surface of claim 2, wherein the at least one box-type segment of the base part is stiffened by a cover, detachably mounted on the side walls.

7. The movable control surface of claim 2, wherein the base part consists of several box-type segments, which are connectable by respectively adjacent side walls.

8. The movable control surface of claim 6, wherein the several box-type segments are arranged side by side such that the joints between the respectively adjacent side walls extend in a direction essentially parallel to a possible movement of the thermomechanically stressed assembly.

9. The movable control surface of claim 1, wherein the load transmission or bearing element includes a section for connecting with said control surface.

10. The movable control surface of claim 1, wherein the movable control member includes load transmission or bearing elements comprising at least one longitudinal beam and at least one transversal beam which are detachably mountable to each other and to the side walls of the at least one box-type segment of the base.

11. The movable control surface of claim 10, having two transversal beams.

12. The movable control surface of claim 10, wherein the at least one longitudinal beam and the at least one transversal beam are about centrally received by and arranged on the base.

13. The movable control surface of claim 10, wherein the load transmission and bearing element comprises at least one rod which transfers the force produced by a motor via the at least one longitudinal beam and the at least one transversal beams onto the base of the movable structural component.

14. The movable control surface of claim 10, wherein the load transmission and bearing element comprises a bearing, arranged between the at least one longitudinal beam as well as the at least one rod and is particularly one of semi-spherical, spherical and dome-shaped.

15. The movable control surface of claim 14, wherein the bearing comprises a one of semi-spherical, spherical a dome-shaped bearing shell which is supported by a bearing pin on the at least one longitudinal beam and a bearing shell receiving device cooperating with the bearing shell which is arranged at the end side of the rod.

16. The movable control surface of claim 10, having two bearing elements.

17. The movable control surface of claim 10, wherein at least one of the side walls are elongated and at the end side portion provided with bores for receiving corresponding bearing bolts of the assembly, the boring axes of which being oriented to each other or to the rotation axis or the one bearing, respectively.

18. The movable control surface of claim 2, wherein the side walls or longitudinal beam or transversal beam or rod is hollow profiled.

19. The structural component of claim 1, wherein the structural elements of connecting elements made by chemical vapor infiltration process, particularly screws, are detachably connectable with each other, which are arranged particularly in the portion of the side walls of the base.

20. The structural component of claim 1, wherein the structural elements are provided with a protective layer for protecting the ceramic from oxidation.

21. The control surface of claim 1, wherein the movable control surface is embodied as a movable control flap of an aerodyne or spacecraft.

* * * * *